United States Patent Office 3,046,189
Patented July 24, 1962

---

3,046,189
NEMATOCIDAL AGENTS
Ernest Jacobi, Siegmund Lust, and Albert van Schoor, Darmstadt, Germany, assignors to E. Merck Aktiengesellschaft, Darmstadt, Germany, a corporation of Germany
No Drawing. Filed Mar. 5, 1958, Ser. No. 719,215
Claims priority, application Germany May 18, 1957
9 Claims. (Cl. 167—22)

This invention relates to nematocides; and in particular is directed to novel nematocidal agents; and methods of combatting nematodes.

The methods and chemical agents known for combatting nematodes in agriculture are not as yet sufficient or adequate in practice fully to accomplish the desired results. The methods heretofore known are in part too expensive (such as soil steaming) and in part the substances used are phytotoxic or somewhat hazardous to the persons working with them, as for example in using chloropicrine.

Investigations carried out to find compounds which exhibit nematocidal activity have resulted in the discovery that thiolcarbamic esters containing substituents for the hydrogen linked to the nitrogen atom and having the general formula

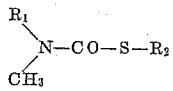

wherein $R_1$ is methyl or hydrogen and $R_2$ is an alkyl radical, are highly suitable for combatting nematodes. The nematocidal activity thereof is manyfold better than that of the sodium salt of N-methyl dithiocarbamic acid which is among the best of the nematocidal agents known at the present time. The N,N dimethyl thiolcarbamic acid-n-butyl-ester has been found to be particularly active.

The N-substituted thiolcarbamic acid esters in accordance with the present invention can be worked into the soil, either as such, or after suitable dilution with inert fillers. They can be used in the form of a fine powder, or as an emulsion or as a solution. It is to be understood and obvious that other substances of similar activity or different activities may also be added.

The compounds in accordance with the present invention may be manufactured by known methods; and can be produced, for example, by condensing primary or secondary amines with the corresponding chloro-thiolformic acid esters or by the addition of mercaptans to isocyanates.

It has already been proposed to use thiolcarbamic esters as herbicides, insecticides or fungicides (see for example U.S. Patent 2,710,259 and French Patent 881,458). However, those patents provide no basis for an expectation that the instant substituted thiolcarbamic esters possess nematocidal activity.

German patent application B18,797 recites among other features the use of N,N-dialkyl thiolcarbamic acid-halogenoaryl-esters as pesticides, especially fungicides. It has been found by comparative testing that N,N-dialkyl thiolcarbamic acid-halogenoaryl esters show a materially lower nematocidal activity than the N,N-dialkyl thiolcarbamic acid alkyl esters.

The following are examples in accordance with this invention:

Example 1

Testing as to nematocidal activity.

(a) In vitro: The surface of an agar plate is covered with the active ingredient and then 2000 nematodes (*Panagrellus zymosiphilus*) are placed upon the plate. The percentage of the mortality is ascertained after 72 hours and the LD 95% is determined. By comparison of the LD 95 values for the investigated compound with the ones of N-methyl-dithiocarbamic-acid-Na the strength of the activity is obtained.

(b) In vivo: Analogous to the test method according to (a) but by employing the culture substrate for *Panagrellus zymosiphilus* instead of the agar preparation. A piece of a Panagrellus culture is inoculated upon the culture and evaluated after 7 days.

The following table shows the nematocidal activity in vitro and in vivo of some of the compounds according to the invention in comparison with the sodium salt of the N-methyl-dithiolcarbamic acid, the nematocidal activity of which is set as being equal to 1.

| Substance | Nematocidal activity | | melt. pt., °C. | boil. pt., °C. |
|---|---|---|---|---|
| | in vitro | in vivo | | |
| N-methyl-thiolcarbamic acid-n-butyl-ester. | ½ | 2 | 41 | |
| N,N-dimethylthiolcarbamic acid n-butyl-ester. | 4 | 10 | | 108–110 below 14 Torr. (mm. mercury). |
| N,N-dimethylthiolcarbamic acid ethyl ester. | 2 | 4 | | 75–77 below 12 Torr. |
| N,N-dimethylthiolcarbamic acid-methyl ester. | 1 | 4 | | 68–70 below 12 Torr. |

Example 2

10.0 parts by weight of N,N-dimethylthiolcarbamic acid-n-butyl-ester are dissolved in 44 parts by weight of xylene, 21 parts by weight of ethylene chloride and 22 parts by weight of tetralin, and mixed with 3 parts of an emulsifier (for example Th. Goldschmidt G. 2081). The solution thus obtained is stable and can be converted by addition of water into an emulsion of the desired dilution. The emulsion can be used as a spraying agent.

Example 3

30 parts by weight of N,N-dimethyl-thiolcarbamic acid-ethyl-ester are mixed with 70 parts of diatomaceous earth and used in this form as dusting or spraying powder and worked into the soil by plowing under, for instance, some time before seeding or planting of seedlings.

Example 4

A solution of 10 parts by weight of N,N-dimethylthiolcarbamic acid isoamyl-ester is prepared according to Example 2. A stable emulsion is obtained which can be used as a spraying agent.

When the nematocides of this invention are used in admixture with suitable vehicles, the concentration of the active ingredients may be varied as desired. High concentrations of an active ingredient, as for example in an amount up to 95 percent, may be suitably admixed as appropriate diluents.

It will be understood that the foregoing description of the invention and the examples set forth are merely illustrative of the principles thereof. Accordingly, the appended claims are to be construed as defining the invention within the full spirit and scope thereof.

We claim:

1. Method of killing nematodes which comprises subjecting nematodes to the action of a substituted thiolcarbamic acid ester of the general formula:

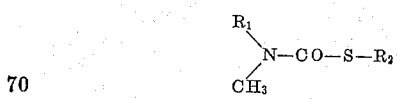

wherein $R_1$ is a member of the group consisting of hydrogen and methyl and $R_2$ is a lower alkyl with a carbon content up to 5 carbon atoms.

2. Method of killing nematodes which comprises subjecting nematodes to the action of N,N-dimethyl-thiolcarbamic acid-ethyl-ester.

3. Method of killing nematodes which comprises subjecting nematodes to the action of N-methyl-thiolcarbamic acid-n-butyl-ester.

4. Method of killing nematodes which comprises subjecting nematodes to the action of N,N-dimethyl-thiolcarbamic acid n-butyl-ester.

5. Method of killing nematodes which comprises subjecting nematodes to the action of N,N-dimethyl-thiolcarbamic acid-methyl ester.

6. Method of killing nematodes which comprises subjecting nematodes to the action of N,N-dimethylthiolcarbamic acid-isoamyl ester.

7. Nematocidal agent comprising substituted thiolcarbamic acid esters of the general formula:

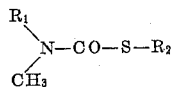

wherein $R_1$ is a member of the group consisting of hydrogen and methyl and $R_2$ is a lower alkyl having from 1 to 5 carbon atoms, an emulsifier and a carrier.

8. A nematocidal agent according to claim 7, wherein the carrier is a solid substance.

9. A nematocidal agent according to claim 7, wherein the carrier is a liquid substance.

References Cited in the file of this patent

UNITED STATES PATENTS

| | | |
|---|---|---|
| Re 22,750 | Tisdale | Apr. 30, 1946 |
| 1,972,961 | Tisdale | Sept. 11, 1934 |
| 2,384,577 | Thomas | Sept. 11, 1945 |
| 2,390,713 | Hunt | Dec. 11, 1945 |
| 2,677,698 | Deutschman | May 4, 1954 |
| 2,710,259 | Blake | June 7, 1955 |
| 2,730,547 | Dye | Jan. 10, 1956 |
| 2,743,209 | Jones | Apr. 24, 1956 |
| 2,757,117 | Birum | July 31, 1956 |
| 2,769,745 | Hardy | Nov. 6, 1956 |
| 2,770,638 | Biolito | Nov. 13, 1956 |
| 2,779,680 | Wolf | Jan. 29, 1957 |
| 2,794,727 | Barrons | June 4, 1957 |
| 2,802,021 | Heininger | Aug. 6, 1957 |
| 2,802,818 | Wheeler | Aug. 13, 1957 |
| 2,809,983 | Heininger | Oct. 15, 1957 |
| 2,853,417 | Werner | Sept. 23, 1958 |
| 2,861,917 | Kosmin | Nov. 25, 1958 |
| 2,913,327 | Tilles | Nov. 17, 1959 |
| 2,913,328 | Tilles | Nov. 17, 1959 |

FOREIGN PATENTS

| | | |
|---|---|---|
| 742,185 | Germany | May 12, 1943 |
| 228,387 | Switzerland | Nov. 16, 1943 |
| 233,721 | Switzerland | Nov. 16, 1944 |
| 881,458 | France | Jan. 28, 1943 |